Patented May 1, 1934

1,956,930

UNITED STATES PATENT OFFICE 1,956,930

PROCESS OF TREATING POLYHALITE WITH CALCIUM CARBONATE

Eugene P. Schoch, Austin, Tex.

No Drawing. Application April 8, 1932,
Serial No. 604,128

8 Claims. (Cl. 23—201)

This invention relates to the recovery of potassium sulphate from minerals containing the same, with attendant transformation of the sulphate of another metal in the mineral to its hydroxide, and particularly has to deal with the treatment of polyhalite or other like mineral with calcium carbonate to produce said results.

Magnesium sulphate in solution does not hydrolyze sufficiently to impart even to boiling liquids a noticeable acidity, and in order to produce magnesium hydroxide from magnesium salts a soluble hydroxide—usually lime—has heretofore been used. By this present discovery, however, it is now possible to produce magnesium hydroxide by heating solutions of magnesium sulphate with finely powdered limestone in closed vessels to temperatures above 150° C. The most suitable temperature range appears to be 190°–200° C.

Thus I mixed 160 grams of a solution containing 14% $MgSO_4$ with an equivalent amount of finely divided calcium carbonate and heated the mixture for one hour at 190° C. and found that the mixture had reacted completely according to the equation:

$$H_2O + MgSO_4 + CaCO_3 = CaSO_4 + Mg(OH)_2 + CO_2.$$

The liberated carbon dioxide gas increased the "steam" pressure by about 5 atmospheres in accordance with the volume at its disposal. The magnesium hydroxide obtained was readily dissolved by means of carbon dioxide in cold water, and I found that limestone may thus be used to produce "basic magnesium carbonate" from magnesium salts instead of lime as has been done heretofore.

In studying the effect upon this reaction due to the presence of potassium sulphate in the solution, I found that large concentrations of the latter salt hinder and even entirely prevent the reaction, but there is no definite limit of concentration of $K_2SO_4$ because it varies with the temperature and the time allowed for action. Thus a solution containing 10% $MgSO_4$, 10% $K_2SO_4$, and mixed with enough $CaCO_3$ to be equivalent to the $MgSO_4$ present was heated for 50 minutes at 150° C., but the resulting solution still contained 5% $MgSO_4$ and hence the reaction was incomplete. Again a solution containing 15.45% $MgSO_4$, 22.4% $K_2SO_4$ and mixed with enough $CaCO_3$ to be equivalent to the $MgSO_4$ present was heated at 200° C. for 1 hour but was found not to have reacted at all.

Yet solutions containing as much as 11% $K_2SO_4$, when heated for 1½ hours at 200° C. allowed all of the $MgSO_4$ present to react with $CaCO_3$.

In my copending application Serial No. 604,662 filed April 11, 1932 and entitled "Process of extracting salts from minerals", I have disclosed the fact that polyhalite was found to be acted upon extensively by water at high temperatures with the dissolution of a part of the magnesium sulphate and a part of the potassium sulphate, and also rendering all of the latter readily extractible. Hence it is to be expected from the preceding that when calcium carbonate also is present in such a mixture of polyhalite and water at high temperatures, the polyhalite should be readily decomposed, the $MgSO_4$ reacting completely with $CaCO_3$ and the $K_2SO_4$ dissolving to form a fairly concentrated solution. This I have found confirmed by trial.

The following example illustrates an actual result obtained:

A mixture of 200 grams polyhalite, 35 grams of powdered limestone, and 653 grams of a solution containing 5% $K_2SO_4$, was heated in a closed vessel at 190° C. for 1 hour and then at 205° C. for 30 minutes.

It yielded:

530 grams filtrate containing 10.1% $K_2SO_4$.

The filter cake was washed with hot water yielding 180 grams wash liquid containing 6.2% $K_2SO_4$.

It was then treated with 4 successive portions of 500 grams of water at 65° C. each for 10 minutes, which yielded 1,000 grams containing 1.6% $K_2SO_4$
1,000 grams containing 0.5% $K_2SO_4$.

The solid residue was then free from potash. The polyhalite contained 200×27.2%=54.4 grams $K_2SO_4$. The 5% $K_2SO_4$ solution contained 653×5=32.6 grams $K_2SO_4$. Total potash supplied 87 grams $K_2SO_4$.

The resulting liquids contained:

First filtrate____ 530×10.1=53.6 grams $K_2SO_4$
First wash_____ 182× 6.2=11.3 grams $K_2SO_4$
2nd wash_____ 1,000× 1.6=16. grams $K_2SO_4$
3rd wash_____ 1,000× 0.5= 5. grams $K_2SO_4$ Total extracted_____85.9 grams $K_2SO_4$

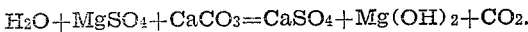

$\frac{85.9}{87}$=98.8% extracted.

I have also found that by using enough water to obtain a concentration of 9% in the liquid during the reaction procedure, then complete reaction is attained in 1 hour. Furthermore, the calcium sulphate resulting from this acton is found to be anhydrite, which is so inactive as to make it possible to extract all of the potassium sulphate rapidly with hot water, as in the example given above.

A particularly important result of this process is the fact that the calcium sulphate produced is in the form of anhydrite, and that this is chemically so inactive as not to unite with potassium sulphate. Certain it is that all of the potassium sulphate is readily extractible with hot water from the solid residue obtained in this process, and this coupled with the fact that the solution formed at high temperatures has been obtained with concentrations as high at 11% $K_2SO_4$, and coupled with the further fact that the extracted calcium sulphate is in the form of anhydrite indicates that no compound similar to syngenite ($CaSO_4$, $K_2SO_4$, $H_2O$) or pentasalt ($5CaSO_4$, $K_2SO_4$, $H_2O$) can be present because hot water cannot extract potassium sulphate from these as it can from the solid residue obtained in this process. Since as a result of the reaction with calcium carbonate, the amount of calcium sulphate is increased by 50%, it follows that any tendency shown by it to retain or combine with potassium sulphate would be correspondingly greater, and the fact that this process does away with any such tendency of the calcium sulphate to retain or combine with potassium sulphate is hence of particular value.

It is evident that this same advantage will accrue to any similarly reacting mixture when treated under the same conditions. Thus alunite, which is a mineral composed of $K_2SO_4$, $Al_2(SO_4)_3$, and $Al_2O_3$ in various proportions, will naturally react with limestone in the same way because, as every chemist knows, $Al_2(SO_4)_3$ hydrolyzes more readily than $MgSO_4$ does, and the resulting mixture, when produced at high temperatures under pressure, will allow the potassium sulphate to be extracted just as readily as from these polyhalite mixtures, and for the same reasons. Hence, this discovery is equally applicable to all mixtures or compounds of $K_2SO_4$ with the sulphate of any other metal hydrolyzable with $CaCO_3$ under conditions similar to those in the treatment of polyhalite.

It is obvious that those skilled in the art may vary the steps and combinations of steps constituting the process without departing from the spirit of the invention, and therefore it is not desired to be limited to the foregoing except as may be required by the claims.

What is claimed is:—

1. The process of producing magnesium hydroxide which consists in providing a mixture containing magnesium sulphate and calcium carbonate in substantially equivalent amounts; wetting said mixture; and subjecting the wetted mixture in a closed vessel to a temperature above 150° C.

2. The process of producing magnesium hydroxide which consists in providing a mixture containing magnesium sulphate and calcium carbonate in substantially equivalent amounts; wetting said mixture; and subjecting the wetted mixture in a closed vessel to heat in a temperature range of 150°–200° C.

3. The process of producing magnesium hydroxide which consists in providing a mixture containing magnesium sulphate and calcium carbonate in substantially equivalent amounts; wetting said mixture; and subjecting the wetted mixture in a closed vessel to heat of approximately 200° C.

4. The process of producing magnesium hydroxide which consists in providing a mixture containing magnesium sulphate and calcium carbonate in substantially equivalent amounts; wetting said mixture; and subjecting the wetted mixture in a closed vessel to a temperature of 190° C. for one hour.

5. The process of producing magnesium hydroxide, carbon dioxide gas, anhydrite, and a solution of potassium sulphate, which consists in mixing polyhalite with water and limestone, the latter in an amount substantially equivalent to the amount of magnesium sulphate in the polyhalite; and heating the mixture in a closed vessel for substantially an hour at a temperature of 190°–210° C. to form the first mentioned substances.

6. The process of producing magnesium hydroxide which consists in providing a mixture containing magnesium sulphate and calcium carbonate in substantially equivalent amounts; wetting said mixture; and subjecting the wetted mixture in a closed vessel to a temperature above 190° C.

7. The process of producing magnesium hydroxide which consists in providing a mixture containing polyhalite and calcium carbonate, the latter in an amount substantially equivalent to the magnesium sulphate in the polyhalite; wetting the mixture; and subjecting the wetted mixture in a closed vessel to a temperature above 190° C.

8. The process of producing magnesium hydroxide, carbon dioxide gas, anhydrite, and a solution of potassium sulphate, which consists in mixing polyhalite with water and limestone, the latter in an amount substantially equivalent to the amount of magnesium sulphate in the polyhalite, and heating the mixture in a closed vessel for substantially an hour at a temperature above 190° C. to form the first mentioned substances.

EUGENE P. SCHOCH.